United States Patent
Walker (10) Patent No.: US 7,671,785 B1
(45) Date of Patent: Mar. 2, 2010

(54) DUAL MODE WEATHER AND AIR SURVEILLANCE RADAR SYSTEM

(75) Inventor: William H. Walker, Madison, AL (US)

(73) Assignee: Baron Services, Inc., Huntsville, AL (US)

(*) Notice: Subject to any disclaimer, the term of this patent is extended or adjusted under 35 U.S.C. 154(b) by 341 days.

(21) Appl. No.: 11/300,908

(22) Filed: Dec. 15, 2005

(51) Int. Cl.
*G01S 13/95* (2006.01)

(52) U.S. Cl. .................. 342/26 D; 343/766; 343/876

(58) Field of Classification Search ............ 342/26 R, 342/115, 162, 188, 192, 194, 196, 160, 159, 342/840, 59, 175, 26 D
See application file for complete search history.

(56) References Cited

U.S. PATENT DOCUMENTS

| | | | | |
|---|---|---|---|---|
| 2,650,358 A | * | 8/1953 | Crane | 342/398 |
| 2,956,279 A | * | 10/1960 | Bartholoma | 343/758 |
| 2,964,745 A | * | 12/1960 | Levin et al. | 342/34 |
| 2,975,413 A | * | 3/1961 | Shaw et al. | 342/34 |
| 3,000,007 A | * | 9/1961 | Hansford et al. | 342/175 |
| 3,007,151 A | * | 10/1961 | Cole et al. | 342/34 |
| 3,026,517 A | * | 3/1962 | Nameth et al. | 343/758 |
| 3,028,595 A | * | 4/1962 | Cole et al. | 342/359 |
| 3,049,703 A | * | 8/1962 | Davis | 342/159 |
| 3,159,837 A | * | 12/1964 | Van Alstyne et al. | 342/33 |
| 3,566,403 A | * | 2/1971 | Hills | 342/94 |
| 3,852,762 A | * | 12/1974 | Henf et al. | 343/756 |
| 3,864,688 A | * | 2/1975 | Hansen et al. | 343/756 |
| 3,909,827 A | * | 9/1975 | Tricoles et al. | 342/179 |
| 4,103,300 A | * | 7/1978 | Gendreu et al. | 342/33 |
| 4,323,898 A | * | 4/1982 | Barnes et al. | 342/90 |
| 4,358,768 A | * | 11/1982 | Ernst et al. | 342/429 |
| 4,468,670 A | * | 8/1984 | Suzuki et al. | 343/727 |
| 4,647,939 A | * | 3/1987 | Kolhoff | 343/765 |
| 4,888,539 A | * | 12/1989 | Estabrook et al. | 318/685 |
| 5,337,058 A | * | 8/1994 | Cross | 342/188 |
| 5,410,316 A | * | 4/1995 | Brooks | 342/59 |
| 5,654,890 A | * | 8/1997 | Nicosia et al. | 701/16 |
| 5,668,558 A | * | 9/1997 | Hong | 343/700 MS |

(Continued)

OTHER PUBLICATIONS

Antenae with Cosecant Squared pattern, http:///www.radartutorial.eu/06.antennas/an12.en.html.*

*Primary Examiner*—Thomas H Tarcza
*Assistant Examiner*—Matthew M Barker
(74) *Attorney, Agent, or Firm*—Frank M. Caprio; Paul Sykes; Bradley Arant Boult Cumming LLP (57) ABSTRACT

A radar system having first and second modes of operation comprising a dual antenna assembly comprising first and second antennas having respective first and second antenna waveguides coupled to a waveguide switch operable to divert RF energy to or from either said antenna waveguide, said waveguide switch coupled to a common waveguide, said dual antenna assembly mounted to an antenna support assembly, said first and second antennas being designed for use in said first and second modes respectively and operable for coupling said RF energy to a transmit medium, and for coupling reflected RF energy from transmit medium to said first or second antenna waveguide; and a control processor configured with control logic operable to control the functions of said radar system wherein said first and second antennas are mounted generally perpendicularly in the vertical plane with respect to each other and wherein said radar system operates in only one of said modes of operation at any time.

18 Claims, 7 Drawing Sheets

U.S. PATENT DOCUMENTS

| | | | | |
|---|---|---|---|---|
| 5,838,720 | A * | 11/1998 | Morelli | 375/219 |
| 6,061,013 | A * | 5/2000 | Sauvageot et al. | 342/26 R |
| H1959 | H * | 5/2001 | Kikel | 342/51 |
| 6,252,539 | B1 * | 6/2001 | Phillips et al. | 342/26 D |
| 6,317,093 | B1 * | 11/2001 | Harris | 343/765 |
| 6,664,914 | B2 * | 12/2003 | Longstaff et al. | 342/22 |
| 6,781,540 | B1 * | 8/2004 | MacKey et al. | 342/25 F |
| 6,803,875 | B1 * | 10/2004 | Alford et al. | 342/26 R |
| 6,978,149 | B1 * | 12/2005 | Morelli et al. | 455/522 |
| 7,053,813 | B1 * | 5/2006 | Hubbert et al. | 342/26 R |
| 7,062,245 | B2 * | 6/2006 | Miyano et al. | 455/277.1 |
| 7,109,913 | B1 * | 9/2006 | Paramore et al. | 342/26 B |
| 2002/0075179 | A1 * | 6/2002 | Hudson et al. | 342/30 |
| 2003/0117311 | A1 * | 6/2003 | Funai | 342/26 |
| 2004/0056791 | A1 * | 3/2004 | Alford et al. | 342/26 |

* cited by examiner

DUAL MODE WEATHER AND AIR SURVEILLANCE RADAR SYSTEM

BACKGROUND

1. Field

The present invention relates generally to radar systems, and, in particular, to radar systems having dual modes, and still more particularly, to radar systems having a weather radar mode and an air surveillance mode.

2. Description of the Related Art

Since the invention of detection and ranging using radio frequencies, different radar systems have been developed to meet the requirements of detecting different phenomena or objects. All radars work on the same basic principles of transmission of RF energy into the transmission medium (for example, the atmosphere), reception of reflected energy, (also known as backscatter or return energy), and analysis of the received energy to determine the presence and possibly characteristics of the detected object(s). Each type of radar system is optimized for the targets sought to be detected by the radar.

For example, weather radar systems are tailored to detect airborne precipitation, known in the art as hydrometeors. Many weather radars operate in the radar frequency bands and wavelengths that require large antennas and may preferably be horizontally polarized to better detect falling hydrometeors. On the other hand, other radars, for example, air surveillance radars tend to be horizontally linearly, and may be circularly polarized in order to reject returns due to weather in the scan volume. Analysis of the return energy has long been performed by computer processors configured with software that is specifically developed to process the data represented by the received energy.

Being able to detect both weather and air targets meant multiple radar systems, i.e., a weather radar and a separate air surveillance radar, co-located at or near a site of interest. Each separate system would mean installation and operation of separate hardware (antenna, transmitter, receiver, computer processors, power supplies and displays), and separate software modules installed in those systems. This requires sufficient space to install and operate such hardware. It also results in increased costs for the hardware and its maintenance.

Multi-mode radars have been developed to provide detection capability of differing object types in a limited space. For instance, modern fighter aircraft (third generation and beyond) employ radars with multi-mode capability. There is an air-to-air radar for detection of airborne targets, and an air-to-ground radar for air-to-surface weapons targeting. The former may be pulsed, doppler, or pulsed-doppler, while the latter may be a pulse only synthetic aperture radar. There have been radars fielded that incorporate two antennae; one for search and detection, and the second for weapons guidance.

These radars however are only examples of achieving multi-mode capability in the confines of a small air platform. Heretofore, there is not a successfully deployed multi-mode radar for use at air fields, for example, that need a weather radar in addition to air surveillance capability.

SUMMARY

The present disclosure is directed to dual mode radar system that may operate in, for example, a weather detection mode or an air surveillance mode. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

The below described invention is for a radar system that can operate in two modes, for example, weather detection and air surveillance. The system comprises a dual antenna assembly comprising first and second antennae that have respective first and second antenna waveguides coupled to a waveguide switch. The waveguide switch diverts RF energy to or from either antenna waveguide and is coupled to a common waveguide that extends from a pedestal supporting the dual antenna assembly. The first and second antennae are designed for use in said first and second modes respectively.

The pedestal whereupon said antenna support assembly is pivotally mounted with respect to the vertical plane comprises an azimuth section and an elevation section that have respective azimuth and elevation drive means for rotating said antenna support assembly in two planes and respective position indicating means for determining azimuth and elevation angle of the dual antenna assembly. The system includes a control processor configured with control logic operable to control the functions of the radar system. The first and second antennae are mounted generally perpendicularly in the vertical plane with respect to each other and the radar system operates in only one of said modes of operation at any time.

An objective of the present invention is to provide a radar system that can operate in two modes, but occupy a minimum space, and maximize the use of common components, thus reducing costs required for parts and maintenance.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 5 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The appended claims rather than the foregoing description indicate the scope of the invention.

Figure 1:
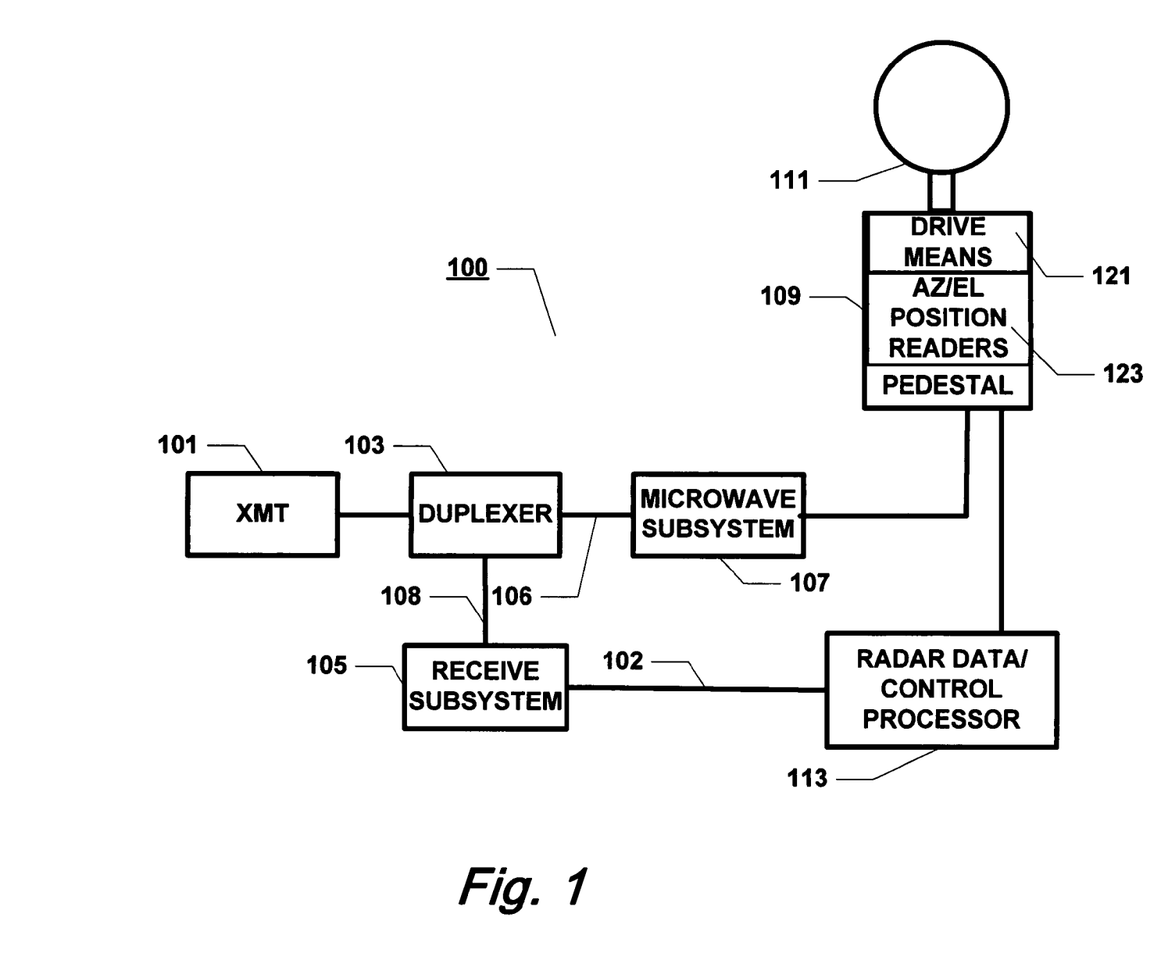
FIG. 1 is a block diagram of the dual mode radar system according to an embodiment of the present invention.

With reference to FIG. 1, an exemplary dual mode weather and air surveillance radar system 100 comprises a transmitter 101 having an output coupled to a duplexer 103. Duplexer 103 is further coupled to a transmit output 106 and to an output that is a receive output 108. Transmit output 106 is coupled to dual antenna assembly 111 through microwave subsystem 107. Receive output 108 is coupled to a receive subsystem 105. Receive subsystem 105 has a received signal output 102 that is coupled to radar data and control processor 113.

As discussed and shown in greater detail below, dual antenna assembly 111 comprises both an antenna optimized for weather observation and an antenna designed for air surveillance. Dual antenna assembly 111 is mounted on pedestal 109 which includes drive means 121 that drives rotation of dual antenna assembly 111 in either mode as would be understood by those skilled in the relevant arts. Dual antenna assembly 111 is pivotally mounted upon the pedestal 109 with respect to a vertical plane with means for varying the antenna's elevation coupled thereto. Pedestal 109 may also antenna azimuth and elevation reading means 123 which operate to determine the angular position of antenna 111, and relay that data to control processor 113.

Transmitter 101 may be an electromagnetic signal transmitter capable of transmitting at a pulse repetition frequency (PRF) of about 250 to about 1180 pps. Preferably, transmitter is also capable of emitting in controllably variable pulse widths. For example, pulse widths may range from about 0.4 to about 2.0 μs. The pulse width may be set by a control circuit. A solid state modulator that is also pulsewidth agile may also be used. The modulator provides a high-power pulse of about 26 kV to about 28 kV at the cathode of the magnetron, thus causing the magnetron to oscillate at the proper frequency under the selected pulse width. Transmitter 101 may also include a magnetron which may operate at about 5300 MHz to about 5800 MHz. As would be appreciated by those skilled in the art, the magnetron generates the radio frequency (RF) energy that is fired to transmit a pulse.

Figure 2:
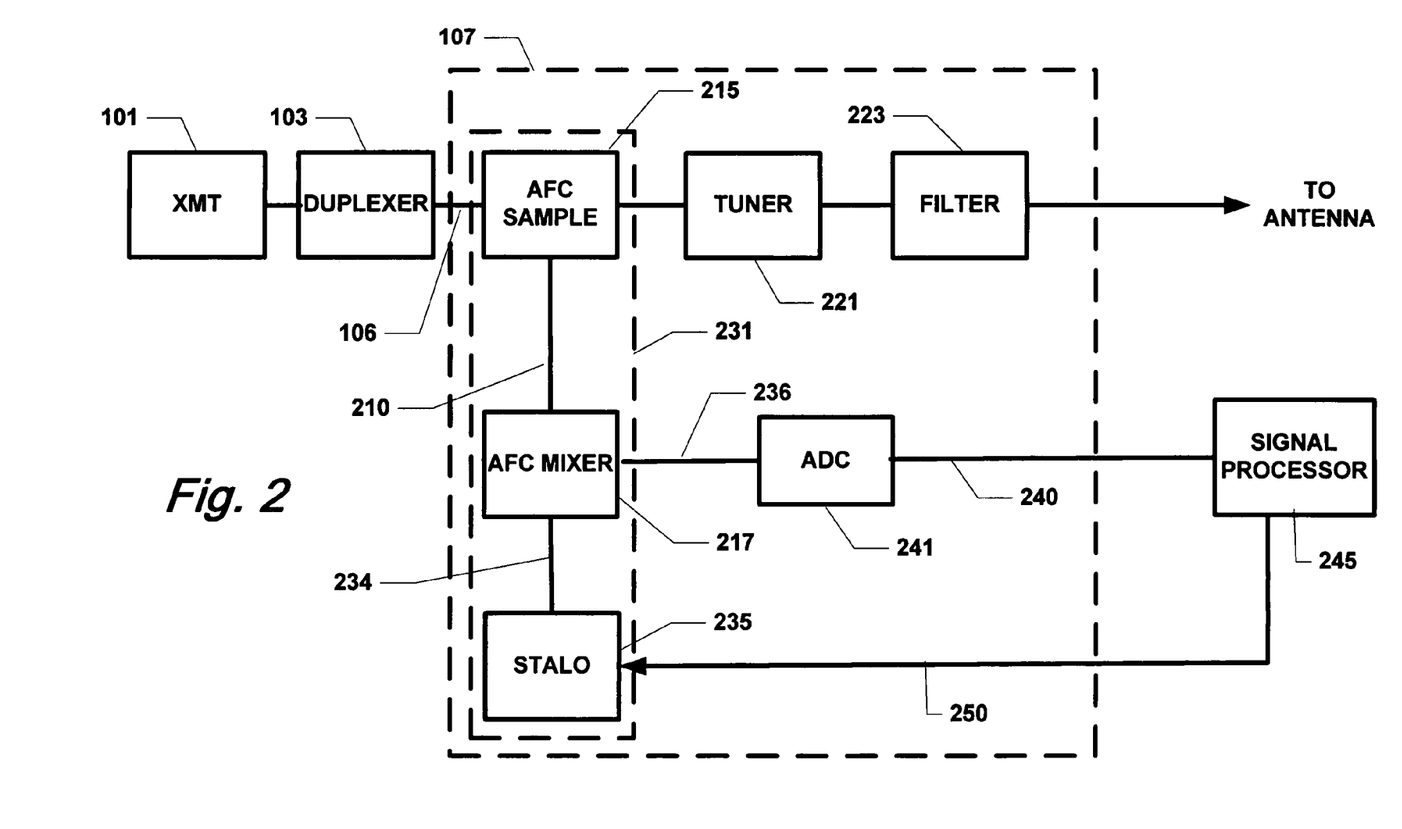
FIG. 2 is a block diagram of the microwave subsystem of the dual mode radar according to an embodiment of the present invention.

Microwave subsystem 107 is described in greater detail with reference to FIG. 2 where there is depicted, transmitter 101 coupled to duplexer 103 as described above. Duplexer 103 has a transmit output 106 that is coupled to microwave subsystem 107 which is comprised of a tuner having an output that may be coupled to filter 223 before it is coupled to antenna system. Microwave subsystem 107 also advantageously may comprise an automatic frequency control (AFC) subsystem 231 which further comprises sampler 215 coupled to the transmit feed line and having an output coupled to an input to mixer 217. Mixer 217 has a second input from a stable local oscillator 235 and an output coupled to an analog-to-digital converter (ADC) 241.

In operation, transmit energy output 106 from duplexer 103 is applied to tuner 221 which adjusts signal power in the event there exists a difference between reflected power (VSWR) in the waveguide and transmitted power. Preferably, tolerances for operation of tuner 221 should result in a ratio between reflected power and transmitted power of less than 1.1 to 1. Transmit energy may then be applied to a filter 223, preferably a lowpass filter. In one embodiment, filter 223 passes a band between about 5300 MHz to about 5800 MHz to avoid interference with neighboring C-band emitters/receivers. Other filtering may be used in lieu of, or in conjunction with bandpass filter to achieve desired signal spectra as would be appreciated by those skilled in the arts. Transmit energy from filter 223 is guided to rotary waveguide couplers mounted in the pedestal to direct the transmitted energy to the dual-mode antenna 111.

Concurrently, automatic frequency control subsystem 231 provides control of receive subsystem frequency by sampler 215 routing sample signals 210, which are RF transmit sample signals from the transmitter output 106 to AFC subsystem 231. The sample signal 210 is preferably about −80 dBm of the 350 kilowatt pulse. Sample signal 210 is applied to mixer 217 to which is also applied a local oscillator signal 234 output from a stable local oscillator (STALO) 235. The mixer 217 heterodynes RF transmit sample 210 with STALO signal 234 to produce a burst pulse signal 236 that is phase-coherent with the transmitter signal 106. Burst pulse signal 236 is then coupled to ADC 241 and converted to a digital burst signal 240 representing the phase-coherent frequency and phase information. Digital burst signal 240 is received by the signal processor 245 which measures the digital burst signal. If the frequency of digital burst signal 240 is not within some delta of the frequency of STALO signal 234 (for example, within +/− 10KHz of STALO signal 234), signal processor 234 generates a control signal 250 that is applied to an automatic frequency control circuit, discussed and shown in greater detail below. The control signal 250 is processed to produce a digital error signal to the STALO to ensure desired separation between the transmitted RF frequency and the STALO RF frequency.

Duplexer 103 allows the radar system to both transmit and receive RF energy using a single antenna (i.e., monostatic radar). Duplexer 103 preferably provides at least about 25 dB of isolation between the transmitted and received RF signals. Duplexer 103 may be achieved with a "4-port circulator" wherein transmitted energy enters the 4-port circulator at a first port 1 ("port 1"), and exits at a second port ("port 2"). Received energy enters the 4-port circulator at port 2 and is fed to the receiver subsystem 105 via a third "port 3." If VSWR occurring in the waveguide transmission line does not match the transmitted power, it is fed to a dummy load coupled to "port 4" of the 4-port circulator. Port 1 may be equipped with a forward power coupler, which is used to measure transmitted power. Similarly, port 4 may be equipped with a reflected power coupler and used to measure reflected power.

Figure 3:
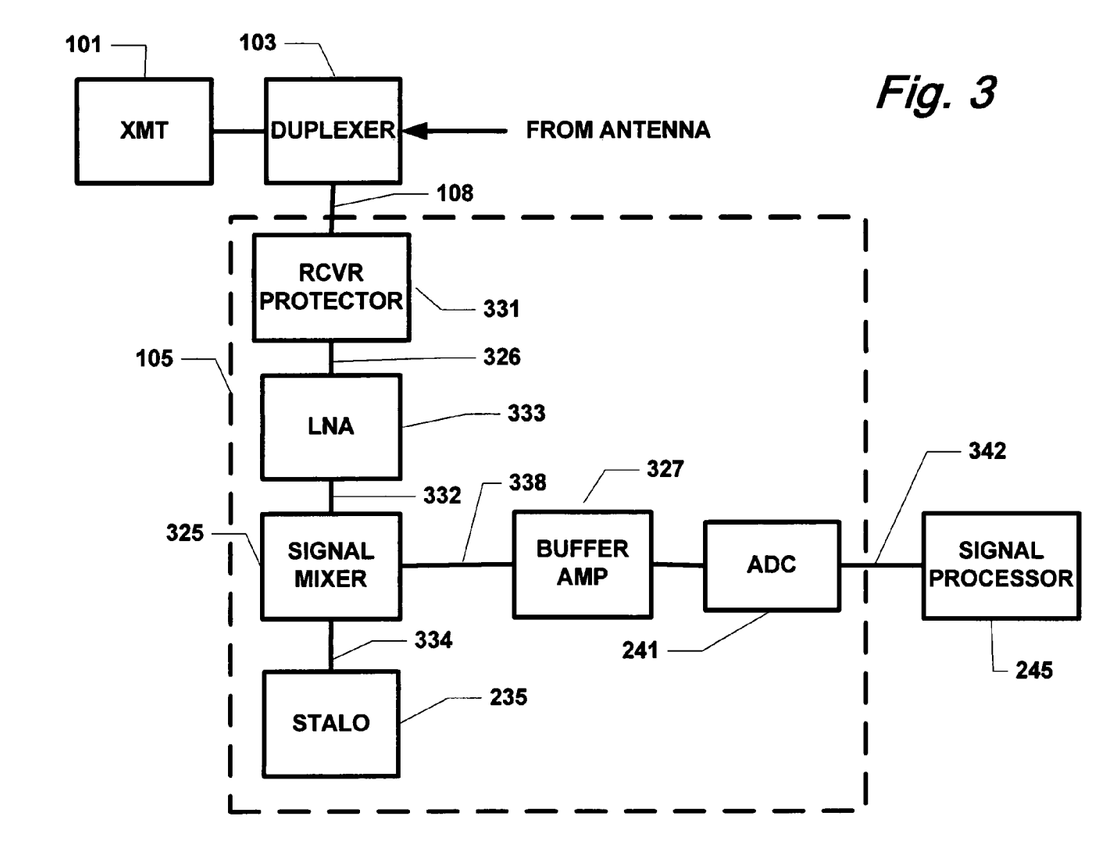
FIG. 3 is a block diagram of the receive subsystem of the dual mode radar according to an embodiment of the present invention.

The receive subsystem 105 is discussed in detail with reference to FIG. 3 beginning with duplexer 103 which is has a receive energy output 108 coupled to a protector 331. Protector 331 is coupled to an amplifier 333 which is preferably a low noise amplifier (LNA). LNA 333 is then coupled to a signal mixer 325. Signal mixer 325 also has a input signal from a stabilized STALO 235 which may be achieved by using the same STALO as that described with reference to FIG. 2. Signal mixer 325 has an output coupled to a buffer amplifier 327 which is coupled to ADC 241 which also may be the ADC described with reference to FIG. 2. ADC 241 also has an output that is coupled to digital signal processor 245.

Backscatter energy captured by the antenna is coupled back through waveguide to the duplexer 103 receiver port. Duplexer 103 receive output 108 is coupled to receiver protector 331 which acts as a transmit/receive switch and blocks transmitted pulses from the receive subsystem. Protector 331 measures energy applied through the system at the receive output port of duplexer 103. If such energy is greater than VSWR (reflected energy) then protector 331 blocks such energy from the remainder of the receive subsystem 105. If such energy is less than VSWR, then protector 331 allows this energy to be applied to the remainder of receive subsystem 105. Protector 331 output 326 is then preferably coupled to a low noise amplifier (LNA) 333 which in one embodiment is configured to operate with a low noise figure of about 1.3 dB. Preferably, the pass band of the LNA is between about 5300 MHz to about 5800 MHz. The saturated output power (1 dB compression) of the LNA is preferably +13 dBm. LNA output is a received RF signal 332.

Received RF signal 332 is coupled to a signal mixer 335 which also receives as input the output a STALO signal 334 from STALO 235. STALO signal 334 is mixed with the received RF signal 332 to generate a received IF signal 338. Received IF signal 338 is coupled to ADC 241, preferably via buffer amplifier 337 which may be used to set the linear range of the receiver to about 93 dBm. ADC 241 converts received IF signal 338 to a digital received signal 342 which is coupled to signal processor 245 for processing.

Radar data and control processor 113 may be configured to provide the functions described as being performed by signal processor 245 as would be appreciated by those skilled in the relevant arts. Radar data and control processor 113 is a processor that is configured with control logic to provide signal control and analysis of both transmitted and received radar energy. Further, it may be configured with control logic provide control signals to direct movement of antenna in both rotation and elevational position.

Figure 4:
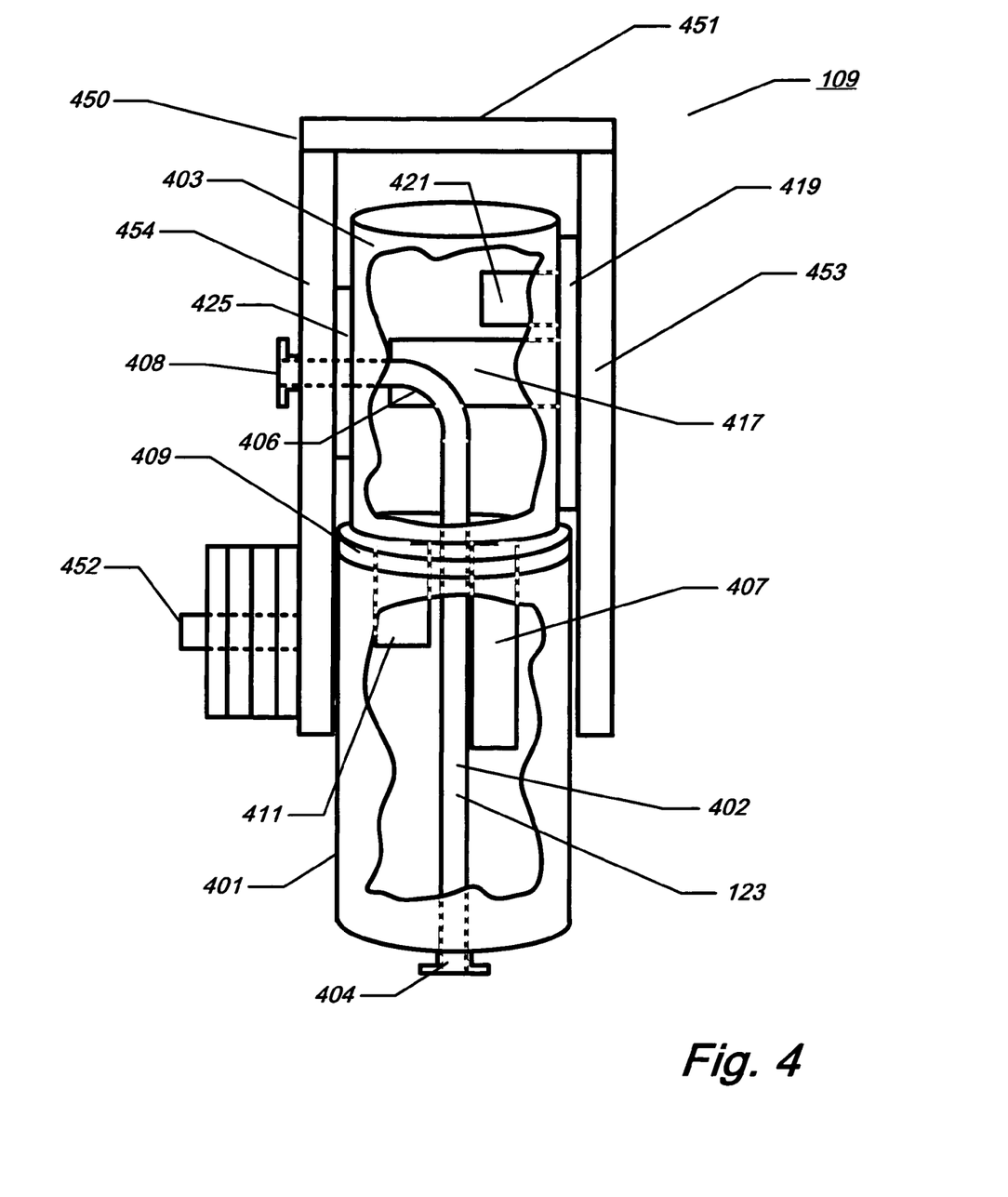
FIG. 4 illustrates a pedestal for use in the dual mode radar system, with cut-away sections, according to one embodiment of the present invention.

Pedestal 109 provides a stand upon which antenna is mounted in addition to housing for antenna drive and control means as well as wave guide structures to port the RF energy to and from antenna 111. With reference now to FIG. 4, pedestal 109 may be provided in two sections. The depicted embodiment is known in the art as an "elevation-over-azimuth" arrangement because it comprises an azimuth drive and control section 401 at the base and an elevation drive and control section 403 above it. Azimuth section 401 is a generally cylindrical housing for azimuth drive motor 407 which is rotationally engaged with azimuth turntable 409 via reduction gears (not shown), as would be understood by those skilled in the art. Azimuth turntable 409 is secured to azimuth section 401 in a manner to allow free rotation thereof. Also rotationally engaged with azimuth turntable 409 is azimuth position reader 411.

Elevation section 403 is mounted to azimuth turntable 409, and similarly is a generally cylindrical housing for elevation drive motor 417 which is rotationally engaged with elevation driving turntable 419 via reduction gears (not shown), as would be understood by those skilled in the art. Also, rotationally engaged with elevation driving turntable 419 is elevation position reader 421. Elevation turntable 419 is disposed external to the housing and is secured thereto in a manner that allows rotation of the turntable 419 in the vertical plane.

Also housed within pedestal 109 is waveguide structure 123 which is comprised of a lower rotary coupler 404 coupled to vertical waveguide 402. Vertical waveguide 402 extends the length of the azimuth section through azimuth turntable 409 and into elevation section where it is coupled to flexible waveguide 406. Vertical waveguide 402 may be coupled to flexible waveguide 406 by means of rotary couplers (not shown) as would be understood by those skilled in the relevant arts. Flexible waveguide is bent at about ninety degrees and extends through elevation section wall through a turning bearing 425 to an upper rotary coupler 408. Turning bearing 425 is secured to elevation section housing 403 in a manner that allows rotation of the bearing 425 in the vertical plane.

Mounted to both elevation turntable 419 and turning bearing 425 is antenna support assembly 450 comprised of an antenna mounting platform 451 which is affixed to opposing support arms 453, 454. A counter-weight assembly 452 may be attached to at least one support arm. Although not shown in the Figure, dual antenna assembly 111 is fixedly mounted to antenna support platform 451.

Azimuth and elevation drive motors 407, 417 may be electric DC motors that drive planetary reduction gears engaged with the turntables 409, 419. Azimuth section 401 may be configured to drive rotation of the azimuth turntable 409 through 360°, i.e. no mechanical or other limits. Because the elevation section 403 is fixedly mounted to the azimuth turntable 409, it rotates with the azimuth turntable 409. Operation of azimuth drive motor 407 is configured to be controlled by radar data/control processor 113. Concurrently, elevation drive motor 417 rotates elevation turntable 419 in like manner, with control provided by radar data/control processor 113, and consequently the antenna support assembly, with dual antenna mounted thereon is rotated in the vertical axis; however, its rotation must be limited. This may be achieved with electrical limit switches, limits encoded within control logic resident in the radar data/control processor 113, as well as buffered mechanical stops. For example, in one embodiment, control logic limits may command reversal of antenna assembly vertical rotation when antenna vertical position reaches a lower limit of −4° and an upper limit of +94°. As a back-up, electrical limit switches may be configured to activate with an antenna vertical position lower limit of −4° and an upper limit of +94°. Finally, in the event that both the control logic and electrical switch limiters fail, shock-absorbing mechanical stops may be affixed to the elevation section housing that physically arrest vertical rotation of the antenna assembly at a lower limit of −5° and an upper limit of +95°.

Azimuth and elevation position readers 411, 421 are known as "encoders" in the art that serve to determine the antenna's angular position in the horizontal and vertical planes of rotation respectively, during scanning operations and provide that data to radar data/control processor 113.

Figure 5A:
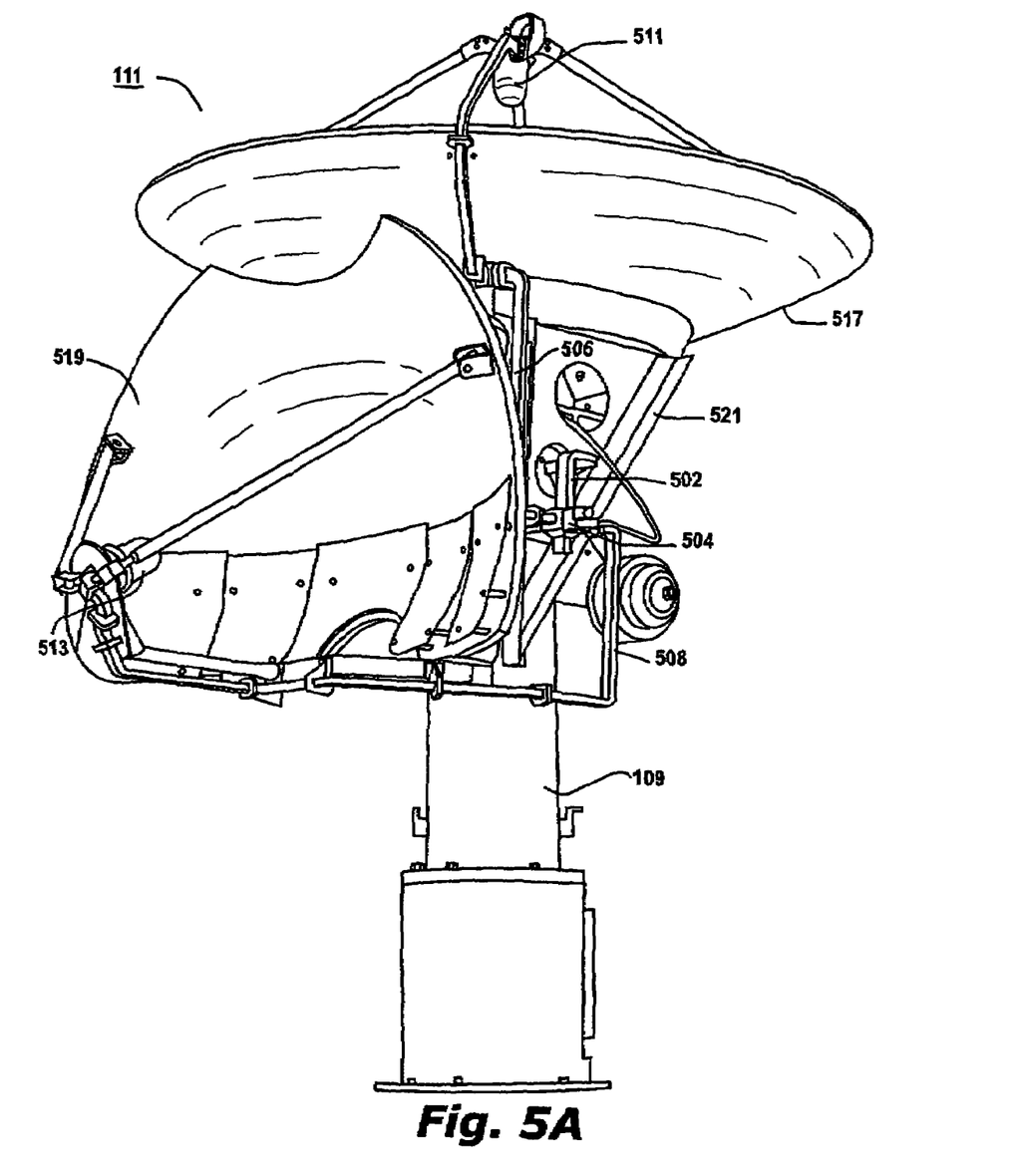
FIG. 5A is a perspective view of the antenna pedestal with dual antenna mounted thereon depicting a first operational mode according to an embodiment of the present invention.
Figure 5B:
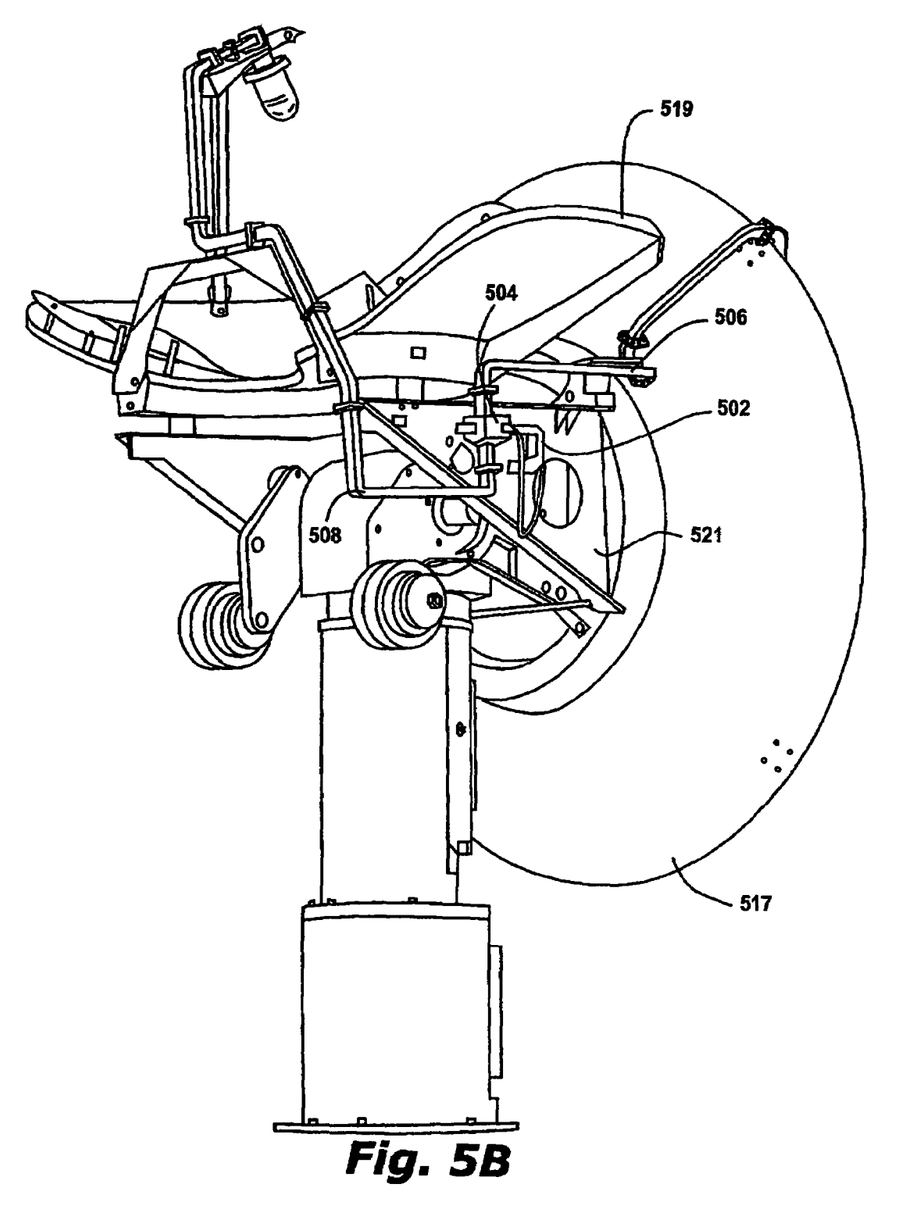
FIG. 5B is a second perspective view of the antenna pedestal with dual antenna mounted thereon depicting a second operational mode according to an embodiment of the present invention.
Figure 5C:
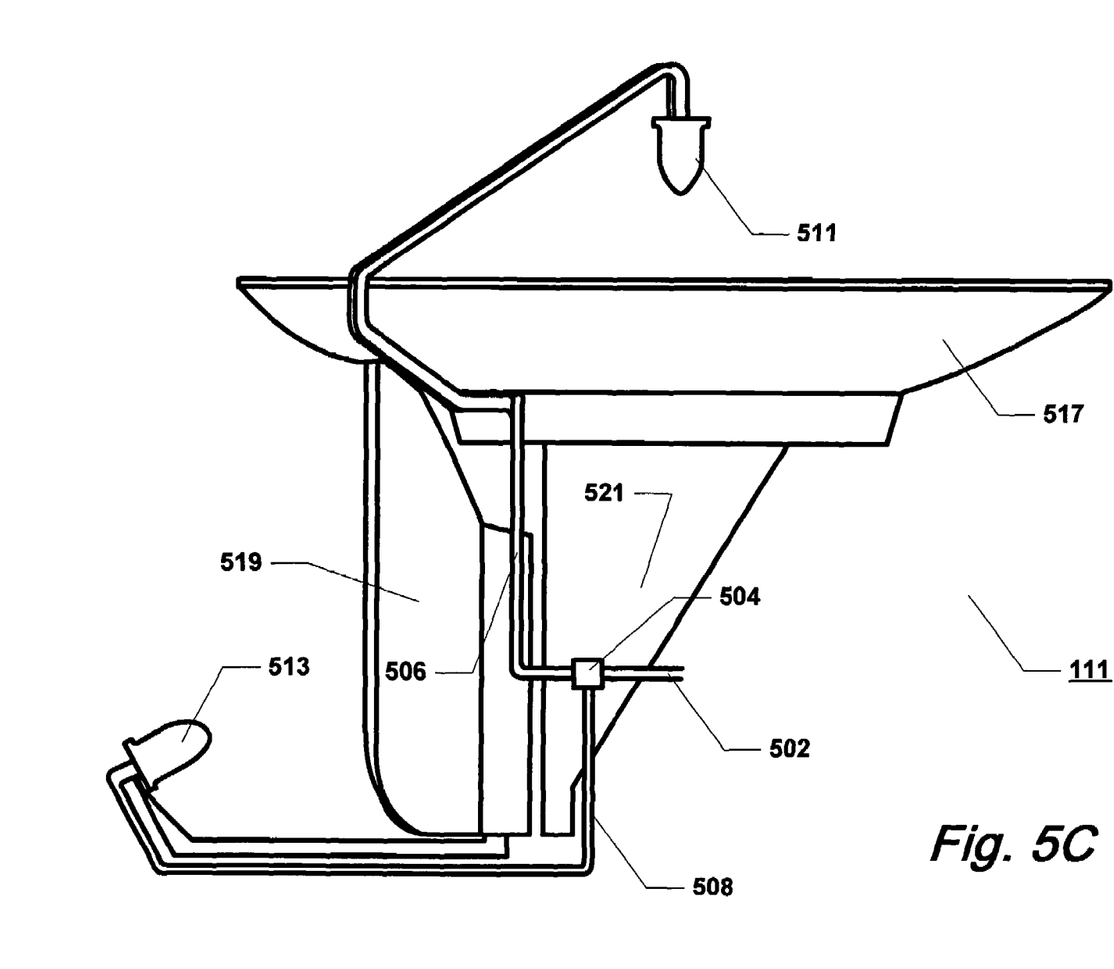
FIG. 5C is a schematic view of the dual antenna according to an embodiment of the present invention.

FIGS. 5A-C depict various aspects of dual antenna assembly 111 comprises a weather (WX) antenna 517 co-mounted with an air surveillance (AS) antenna 519. Weather antenna 517 may be any suitable parabolic reflector with any polarization technique. Preferably, WX antenna 517 is configured for horizontal polarization in order to best capture hydrometeors. WX antenna 517 optimally produces a circular pencil beam with a gain of 40 dB and a beamwidth of 1.5 degrees which allows WX antenna to couple a narrow focused beam into the air to capture precipitation backscatter.

AS antenna 519 may be any suitable antenna designed for air surveillance. For example, in one embodiment, AS antenna is a specialized sectioned parabola that generates a pseudo-cosecant$^2$ beam shape having an azimuthal beamwidth of 1.6 degrees and an elevational beamwidth of 30 degrees. Circularly polarized transmitted energy rolls off at a cosecant rate from maximum gain to minimum gain as a function of the elevation angle, as would be appreciated by those skilled in the relevant art, such that a constant power illuminates aircraft when flying at a constant altitude. This constant power characteristic of the AS antenna and the measured signal-to-noise ratio of the return may be employed by the system to estimate the size of the aircraft. The AS antenna preferably operates with circular polarization to aide in eliminating returns from weather formations, i.e. rain. This allows the radar to acquire aircraft and plot them on the displays even when the detected aircraft passes through weather.

WX and AS antennas 517, 519 are preferably oriented substantially reciprocally (about 180° apart), facing away from each other in the horizontal plane. It is further preferable to mount antennas 517, 519 roughly perpendicularly with respect to the other in the vertical plane, mounted to adjacent perpendicular portions of antenna mounting bracket 521 which is secured to antenna support assembly 450 from FIG. 4. External waveguide 502 is coupled to upper rotary coupler 408 (shown in FIG. 4) and is coupled at its opposite end to waveguide switch 504 from which extends WX antenna waveguide 506 and AS antenna waveguide 508. WX waveguide 506 is ultimately coupled to WX antenna feed horn 511 and, likewise, AS waveguide 508 couples to AS antenna feed horn 513. It should be noted that depending upon the size of the two antennas, one antenna may be altered to accommodate the other. For instance, in one embodiment depicted in FIG. 5A, the top of the AS antenna 519 reflector includes a recess that conforms to the back of the WX antenna 517 reflector.

When radar system is in a weather mode, WX antenna 517 is in a deployed position with its beam centered at an elevation of roughly one half of the 3 Db beamwidth above the horizon and AS antenna 519 is in the stowed position (roughly +90° elevation), shown in FIG. 5B. Antenna 111 is driven by motors in pedestal 109 to rotate in azimuth and/or elevation. During weather mode, waveguide switch 504 is open to divert RF from external waveguide 502 to WX waveguide 506 and thence to WX feedhorn 511. When desired or required, the system may be converted to air surveillance mode where WX antenna 517 is rotated to the stowed position and the AS antenna 519 is rotated to the deployed position for scanning (shown in FIG. 5A). Concurrently, waveguide switch 504 is commanded to flip, diverting RF energy from external waveguide 502 to AS waveguide 508 and thence to AS feedhorn 513. At the same time, the processor signal analysis functions switch from a weather scanning mode to an air surveillance mode. Conversion back to weather mode simply reverses the process. Preferably, when the antennas are switched, the previously stowed antenna is not only driven to depart from the +90° position to scanning elevation, but also to slued in azimuth to the same azimuth angle where the previously deployed antenna was when the mode switch was initiated.

Control processor 113 provides control over all radar system functions described above and is configured with control logic which causes processor to implement necessary control commands. Control of antenna positioning and modes is also provided by control processor 113 as suggested above, and specifically, control of the tasks for conversion from one mode to the other is provided by control processor including the switching of antennas and the flipping of the waveguide switch. It is well-known that in signal processing, reflected energy is processed in a manner that determines the bearing, altitude and range of the source of the reflection from the site. Antenna azimuth and elevation angle must be known in order to determine the bearing from where reflected energy is received. As described above, antenna position data is relayed to control processor 113 by the respective position indicators, or encoders 411, 421.

Scanning may be performed in a variety of ways depending upon the desires of the operator. When in weather mode, the scanning may be a conventional volumetric scan conducted beginning with a preset +0.8° (half of the beamwidth) elevation and an elevation step-up equal to the beam width after every 360° of rotation until the full volume desired is scanned. The scan rate of the system, depending upon the drive motors, is preferably from 0 to about 6 rpm. The system may be configured with control logic to initiate a mode change to air surveillance automatically. For example, in one embodiment, the radar could maintain a weather scan to cover the full scan volume, and then control logic could command the system to change modes and search for airborne targets for its entire scan volume. In a further embodiment, the system could remain in air surveillance mode for a desired period of time, e.g., 30 minutes, 1 hour, 4 hours, and so on, and programmed to automatically switch to weather mode. The system could then complete a full weather scan, and then return to air surveillance mode. This is advantageous in situations when weather is not expected, or is slowly changing, therefore, information about the weather need not be updated as frequently.

It should be noted that although they are not described above, the radar system could further comprise operator stations with displays and controls for operator interface. Any such stations would also be controlled by the radar control processor. A display could be used for both modes. Such a display may be configured with control logic, through the control processor or separately, such that it will be display optimized for the first mode, and then change along with the switching of modes to a display optimized for the second mode as would be appreciated by those skilled in the relevant arts.

An objective of the dual mode radar system is to provide the functions of a weather radar along with an air surveillance radar in a minimal amount of space. To achieve this objective, the system is preferably configured with one set of encoders. As such, azimuth and elevation data are derived from the position of the antenna support assembly 450. With respect to elevation angle, the position of the assembly 450 may be accurate for only one of the two antennas 517, 519. Therefore, the elevation angle of the opposing antenna relative to other must be account for in processing. For example, if the system is configured such that the elevation angle of the assembly 450 coincides with the WX antenna 517, the elevation angle data for the AS antenna 519 when it is scanning will be offset by 90° from the information the encoders provide to the control processor 113. Control logic resident in the control processor 113 includes computational features that take the offset into account when determining elevation angle of the opposing antenna.

Control processor 113 in effect comprises a computer system. Such a computer system includes, for example, one or more processors that are connected to a communication bus. The computer system can also include a main memory, preferably a random access memory (RAM), and can also include a secondary memory. The secondary memory can include, for example, a hard disk drive and/or a removable storage drive. The removable storage drive reads from and/or writes to a removable storage unit in a well-known manner. The removable storage unit, represents a floppy disk, magnetic tape, optical disk, and the like, which is read by and written to by the removable storage drive. The removable storage unit includes a computer usable storage medium having stored therein computer software and/or data.

The secondary memory can include other similar means for allowing computer programs or other instructions to be loaded into the computer system. Such means can include, for example, a removable storage unit and an interface. Examples of such can include a program cartridge and cartridge interface (such as that found in video game devices), a removable memory chip (such as an EPROM, or PROM) and associated socket, and other removable storage units and interfaces which allow software and data to be transferred from the removable storage unit to the computer system.

Control logic (also called computer programs) are stored in the main memory and/or secondary memory. Such computer programs, when executed, enable the computer system to perform certain features of the present invention as discussed herein. In particular, the computer programs, when executed, enable a control processor to perform and/or cause the performance of features of the present invention. Accordingly, such computer programs represent controllers of the computer system of a radar system.

In an embodiment where the invention is implemented using software, the software can be stored in a computer program product and loaded into the computer system using the removable storage drive, the memory chips or the communications interface. The control logic (software), when executed by a control processor, causes the control processor to perform certain functions of the invention as described herein.

For example, control processor 113 may also be a signal processor which analyzes backscatter energy to determine the extent and intensity of precipitation or whether an aircraft is approaching the radar site. Control processor 113 may therefore be configured with control logic (software) designed to execute functions that process the received RF energy according whichever mode the system is operating in. Such control logic may be provided in software modules. For example, the control processor may be configured with software for the air surveillance mode and software for the weather mode. Obviously, when converting from one mode to another, the system must also stop execution of one software, and initiate execution of the other.

In another embodiment, features of the invention are implemented primarily in hardware using, for example, hardware components such as application specific integrated circuits (ASICs) or field-programmable gated arrays (FPGAs). Implementation of the hardware state machine so as to perform the functions described herein will be apparent to persons skilled in the relevant art(s). In yet another embodiment, features of the invention can be implemented using a combination of both hardware and software.

As described above and shown in the associated drawings, the present invention comprises an apparatus for a dual mode weather and air surveillance radar system. While particular embodiments of the invention have been described, it will be understood, however, that the invention is not limited thereto, since modifications may be made by those skilled in the art, particularly in light of the foregoing teachings. It is, therefore, contemplated by the following claims to cover any such modifications that incorporate those features or those improvements that embody the spirit and scope of the present invention.

What is claimed is:

1. A radar system having first and second modes of operation, wherein said first mode is a weather detection mode and said second mode is an air surveillance mode, comprising:
   a. a dual antenna assembly comprising first and second antennas having respective first and second antenna waveguides coupled to a waveguide switch operable to divert RF energy to or from either of said first or second antenna waveguide, said waveguide switch coupled to a common waveguide, said first and second antennas being designed for use in said first and second modes respectively and operable for coupling said RF energy to a transmit medium, and for coupling reflected RF energy from transmit medium to said first or second antenna waveguide;
   b. azimuth and elevation motors engaged with said dual antenna assembly for rotating said assembly in two planes to position either of said first or second antenna at a desired azimuth and elevation angle;
   c. respective position indicators for determining azimuth angle and elevation angle of said dual antenna assembly;
   d. an RF transmitter coupled to said common waveguide for transmitting said RF energy;
   e. an RF receiver operable to receive reflected RF energy conveyed thereto by said common waveguide coupled thereto by either of said first or second antennas; and
   f. a control processor configured with control logic operable to control the functions of said radar system
and wherein said first and second antennas are mounted generally perpendicularly in the vertical plane with respect to each other and wherein said radar system operates in only one of said modes of operation at any time.

2. The radar system of claim 1, wherein said first antenna is a parabolic antenna and said second antenna is a cosecant$^2$ parabolic antenna.

3. The radar system of claim 1, wherein said RF energy emitted during operation in said first mode is horizontally polarized.

4. The radar system of claim 1, wherein said RF energy emitted during operation in said second mode is circularly polarized.

5. The radar system of claim 1, wherein said RF energy emitted during weather detection is horizontally polarized and said RF energy admitted during air surveillance is circularly polarized.

6. The radar system of claim 5, wherein said first antenna is a parabolic antenna and said second antenna is a cosecant$^2$ antenna.

7. A radar system having first and second modes of operation, wherein said first mode is a weather detection and said second mode is an air surveillance mode, comprising:
   a. a dual antenna assembly comprising first and second antennas having respective first and second antenna waveguides coupled to a waveguide switch operable to divert RF energy to or from either of said first or second antenna waveguide, said waveguide switch coupled to a common waveguide, said first and second antennas being designed for use in said first and second modes respectively and operable for coupling said RF energy to a transmit medium, and for coupling reflected RF energy from transmit medium to said first or second antenna waveguide;
   b. azimuth and elevation motors engaged with said dual antenna assembly for rotating said assembly in two planes to position either of said first or second antenna at a desired azimuth and elevation angle;
   c. respective position indicators for determining azimuth angle and elevation angle of said dual antenna assembly;
   d. an RF transmitter coupled to said common waveguide for transmitting said RF energy;
   e. an RF receiver operable to receive reflected RF energy conveyed thereto by said common waveguide coupled thereto by either of said first or second antennas;
   f. a control processor configured with control logic operable to control the functions of said radar system; and
   g. an automatic frequency control system;
and wherein said first and second antennas are mounted generally perpendicularly in the vertical plane with respect to each other and wherein said radar system operates in only one of said modes of operation at any time.

8. The radar system of claim 7, wherein said first antenna is a parabolic antenna and said second antenna is a cosecant$^2$ parabolic antenna.

9. A process for interchanging first and second operating modes of a radar system having a dual antenna assembly comprising a first antenna generally perpendicularly mounted with a second antenna, said first antenna being a scanning antenna and said second antenna being a stowed antenna during operation in said first mode, said antennas having first and second respective antenna waveguides coupled to a waveguide switch operable to divert RF energy to or from either said antenna waveguide, said process comprising the steps of:
   a. commanding said second antenna to be rotated to a scanning elevation angle and said first antenna to be rotated to a stowed elevation angle;
   b. diverting RF energy from said first antenna waveguide to said second antenna waveguide;
   c. scanning using said second antenna; and
   d. terminating execution of a first control logic resident in a computer-readable medium and designed for processing data derived from received RF energy during operation in said first mode; and
   e. executing a second control logic resident in said computer-readable medium designed to process data derived from received RF energy during operation in said second mode.

10. The process of claim 9, wherein said step of executing a second control logic further comprises accounting for an angle of offset between said first and second antennas.

11. The process of claim 10, wherein said step of commanding antenna rotation is performed by a control processor.

12. A radar system having first and second modes of operation, wherein said first mode is a weather detection mode and said second mode is an air surveillance mode, comprising a. a dual antenna assembly comprising first and second antennas for emitting and receiving RF energy mounted generally perpendicularly in the vertical plane with respect to each other and having respective first and second antenna waveguides coupled to a waveguide switch operable to divert RF energy to or from either said antenna waveguide, said waveguide switch coupled to a common waveguide, said dual antenna assembly mounted to an antenna support assembly adapted to position either of said first and second antennas at a desired elevation and azimuth angle, said first and second antennas being designed for use in said first and second modes respectively; and
   b. a control processor configured with control logic operable to control the functions of said radar system wherein said radar system operates in only one of said modes of operation at any time.

13. The radar system of claim 12, wherein said system may be switched from said first mode to said second mode automatically.

14. The radar system of claim 13, wherein said first antenna is a parabolic antenna and said second antenna is a cosecant$^2$ parabolic antenna.

15. The radar system of claim 13, wherein said RF energy emitted during operation in said first mode is horizontally polarized.

16. The radar system of claim 13, wherein said RF energy emitted during operation in said second mode is circularly polarized.

17. The radar system of claim 13, wherein said RF energy emitted during weather detection is horizontally polarized and said RF energy emitted during air surveillance is circularly polarized.

18. The radar system of claim 17, wherein said first antenna is a parabolic antenna and said second antenna is a cosecant$^2$ antenna.

* * * * *